US009894842B2

(12) United States Patent
Conley

(10) Patent No.: US 9,894,842 B2
(45) Date of Patent: Feb. 20, 2018

(54) BALE LOADING APPARATUS AND METHOD TO CONVERT BETWEEN A SMALL BALE STACK WAGON AND A BIG BALE STACK WAGON

(71) Applicant: Russell E Conley, Eureka, NV (US)

(72) Inventor: Russell E Conley, Eureka, NV (US)

(*) Notice: Subject to any disclaimer, the term of this patent is extended or adjusted under 35 U.S.C. 154(b) by 0 days.

(21) Appl. No.: 15/383,673

(22) Filed: Dec. 19, 2016

(65) Prior Publication Data

US 2017/0172070 A1    Jun. 22, 2017

Related U.S. Application Data

(60) Provisional application No. 62/270,123, filed on Dec. 21, 2015.

(51) Int. Cl.
*G06F 7/70* (2006.01)
*A01D 90/08* (2006.01)

(52) U.S. Cl.
CPC ................................. *A01D 90/08* (2013.01)

(58) Field of Classification Search
CPC ..... A01D 90/08; A01D 89/001; A01D 89/004
USPC .......................................................... 701/50
See application file for complete search history.

(56) References Cited

U.S. PATENT DOCUMENTS

| | | | | |
|---|---|---|---|---|
| 2,848,127 | A | * 8/1958 | Grey | A01D 90/08 414/492 |
| 3,596,777 | A | * 8/1971 | Neely, Jr. | A01D 85/005 414/789.4 |
| 4,534,691 | A | 8/1985 | Miguel | |
| 4,594,836 | A | * 6/1986 | Good | A01D 87/127 100/188 R |
| 4,718,806 | A | * 1/1988 | Chambers | A01D 87/127 414/24.5 |
| 6,024,534 | A | 2/2000 | Stevenson | |
| 6,048,160 | A | 4/2000 | Reist et al. | |
| 6,364,591 | B1 | 4/2002 | Stevenson | |
| 6,514,029 | B2 | * 2/2003 | Millsap | A01D 90/08 414/24.5 |
| 8,112,202 | B2 | * 2/2012 | Fackler | A01D 90/08 56/474 |

* cited by examiner

*Primary Examiner* — Muhammad Shafi
(74) *Attorney, Agent, or Firm* — Oliff PLC

(57) ABSTRACT

A bale loading apparatus for use in the agricultural applications that enables conversion from a small bale pickup and transport vehicle to a big bale pickup and transport vehicle. A conveyor lifts big bales from the ground in the field onto the receiving table of a bale transport vehicle. A rotating and sliding motion enables the positioning of the big bale lengthwise across the receiving table of the bale transport vehicle. A control system for managing the big bale loading process is also provided.

21 Claims, 9 Drawing Sheets

BALE LOADING APPARATUS AND METHOD TO CONVERT BETWEEN A SMALL BALE STACK WAGON AND A BIG BALE STACK WAGON

FIELD OF THE INVENTION

This invention relates to bale loading on a transport vehicle in an agricultural setting.

BACKGROUND

In the agriculture industry, a large portion of time and effort is directed towards the production of feed for animals. When hay or straw is harvested from a field, it is typically tied into rectangular shaped bales through the use of automatic baling equipment, hereafter referred to as balers. These balers produce bales with a large variety of dimensions, but can generally be classified as small balers and big balers. Small balers generally produce bales that range in size from approximately 14"×18"×36" to 16"×24"×48" (hereinafter "small bale"), and big balers generally produce bales that range in size from approximately 2.5'×3'×8' to 4'×4'×8' (hereinafter "big bale"). Automatic balers usually deposit the bales in rows across the field, leaving them to later be picked up from the field and transported to a barn or other storage facility.

A variety of machines are available that can load and stack small bales, one of the most popular being the New Holland™ stack wagon series. There are also accessories available that provide a method to convert a small bale stack wagon to a big bale stack wagon. In U.S. Pat. No. 6,514,029 issued to Millsap a big bale loading accessory and method to convert a small bale stack wagon to and from a big bale stack wagon is discussed. In U.S. Pat. No. 6,024,534 issued to Stevenson the task of loading big bales and the conversion of a small bale stack wagon to a big bale stack wagon is also addressed. These references are incorporated by reference herein.

In embodiments, the present invention provides an apparatus for a bale transport vehicle that saves time and labor over the aforementioned prior art inventions.

SUMMARY

Embodiments of this invention provide a bale loading accessory that is simple and efficient in operation, durable in construction, inexpensive of manufacture, and easily maintained. In some embodiments, the invention will enable a farmer or other operator to reversibly modify a small bale pickup and transport vehicle to a big bale pickup and transport vehicle by modifying the interface to the transport vehicle which includes the mechanical attachment mechanism, hydraulics and the electrical terminal connections.

Embodiments of the present invention provide an apparatus and method to load big bales that offer improvements over known apparatus and methods. For example, the aforementioned Millsap invention utilizes a clamping device to clamp the edges of a big bale and, through the use of the lifting mechanism attached to the clamping device, lifts, flips, rotates, and deposits the big bale on a receiving table of a bale transport vehicle. In contrast, embodiments of the present invention utilize a different approach by employing an inclined conveyor to raise the big bale from the ground to the receiving table of the bale transport vehicle. A carriage and a push arm rotate and slide the bale to a stacking position on the front of the receiving table. Milisap and embodiments of the present invention both deposit big bales on the forward end of the receiving table with the longitudinal axis of the bale being perpendicular to the longitudinal axis of the bale transport vehicle. However, embodiments of the present invention use a different configuration, which is both simpler and faster, to obtain the desired stacking position of bales.

The Stevenson disclosure discloses a conveyor to lift big bales from the ground to the receiving table of the bale transport vehicle, but then uses a sliding mechanism to slide the bale to the opposite side of the receiving table. With this motion, the longitudinal axis of the big bale is parallel to the longitudinal axis of the bale transport vehicle. However, there are various stacking advantages to the placement of big bales with the longitudinal axis of the bale perpendicular to the longitudinal axis of the bale transport vehicle.

In embodiments, this invention utilizes two hydraulic actuators and one hydraulic motor, which, when installed on bale transport vehicles such as the New Holland™ stack wagon series, can be controlled using existing functions on the bale transport vehicle. In some embodiments, a control system, utilizing inputs from discrete sensing devices, can control the hydraulic actuators to achieve the rotating and sliding motion described hereafter.

Use of an apparatus as described hereafter allows the operator of a bale transport vehicle to approach big bales from their ends (the longitudinal axis of the bale is parallel to longitudinal axis and the direction of travel of the vehicle). The operator can then operate the conveyor of the apparatus to raise the bale from the ground onto the loading table of the vehicle. The apparatus then rotates and slides the bale to a stacking position in which the longitudinal axis of the bale is substantially perpendicular to the longitudinal axis of the vehicle and substantially parallel to the plane of the loading table or receiving table of the bale transport vehicle.

In embodiments, the apparatus is mounted to and removable from a preexisting vehicle. When a small bale stack wagon such as a New Holland™ branded vehicle is modified, its preexisting small bale loader is un-mounted from the vehicle before the big bale accessory is mounted. Generally the big bale accessory is mechanically installed by using two mounting fixtures and one or more of the mounts originally used for the small bale loader. The mounting fixtures may be attached to the vehicle using, e.g., nuts and bolts, and then the accessory is attached to the mounting fixtures by using, e.g., nuts and bolts and/or pins. Hydraulic connection of the hydraulic motor and hydraulic actuators may be accomplished with conventional quick disconnect couplers. The hydraulic actuator originally used to raise and lower the small bale loader can also be used to raise and lower the front of the conveyor on the accessory for big bales.

In other embodiments, the apparatus is an integral part of a bale transport vehicle and thus attached in a more permanent manner.

The apparatus may be configured with sensors to detect the location of a bale on the apparatus and a programmable controller that manages movement of the apparatus and/or other existing components on the transport vehicle. Electric valves may also be installed to direct the flow of oil to different components on the apparatus and/or transport vehicle. In these cases a wiring harness may be permanently installed on the vehicle to allow easy connection to the programmable controller and the wiring harness on the apparatus. Electrical connection between the wiring harness on the vehicle and the wiring harness on the apparatus may be accomplished using quick disconnect terminals.

Hydraulic actuators and a hydraulic motor are described, but it will be recognized by those skilled in the art that other comparable devices and configurations, including pneumatic actuators and motors, could be used.

BRIEF DESCRIPTION OF THE DRAWINGS

Advantages of embodiments of this invention will be apparent upon consideration of the following detailed disclosure, especially when taken in conjunction with the accompanying drawings wherein.

DETAILED DESCRIPTION

Many of the fastening, connection, processes and other means and components utilized in this invention are widely known and used by those skilled in the art. Their exact nature or type is not necessary for an understanding of the invention, and therefore they will not be discussed in significant detail. Also, any reference to the terms "left" or "right" are used as a matter of mere convenience, and are determined by standing at the rear of the machine facing its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention and the practice of a specific application of any element may already be widely known or used in the art by those skilled in the art and each will likewise not be discussed in significant detail. When referring to the figures, like parts are numbered the same in all figures. Also, hydraulic lines and valves have been omitted from FIGS. 1 through 8 in order to simplify the drawings.

Figure 1:
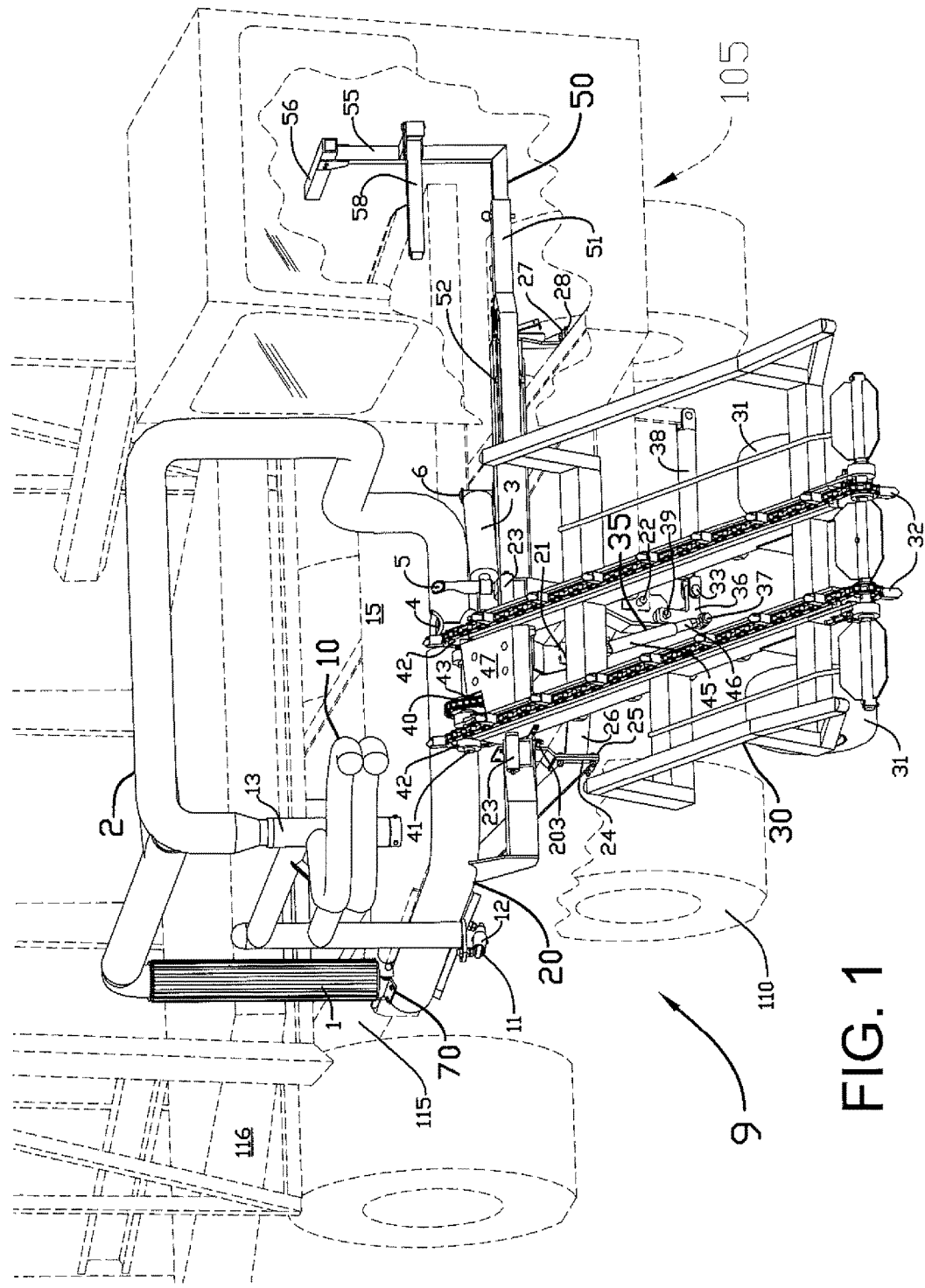
FIG. 1 is a perspective view of a right front portion of a transport vehicle equipped with a big bale apparatus attached in a bale receiving position showing the orientation of the accessory to a receiving table of the transport vehicle.
Figure 2:
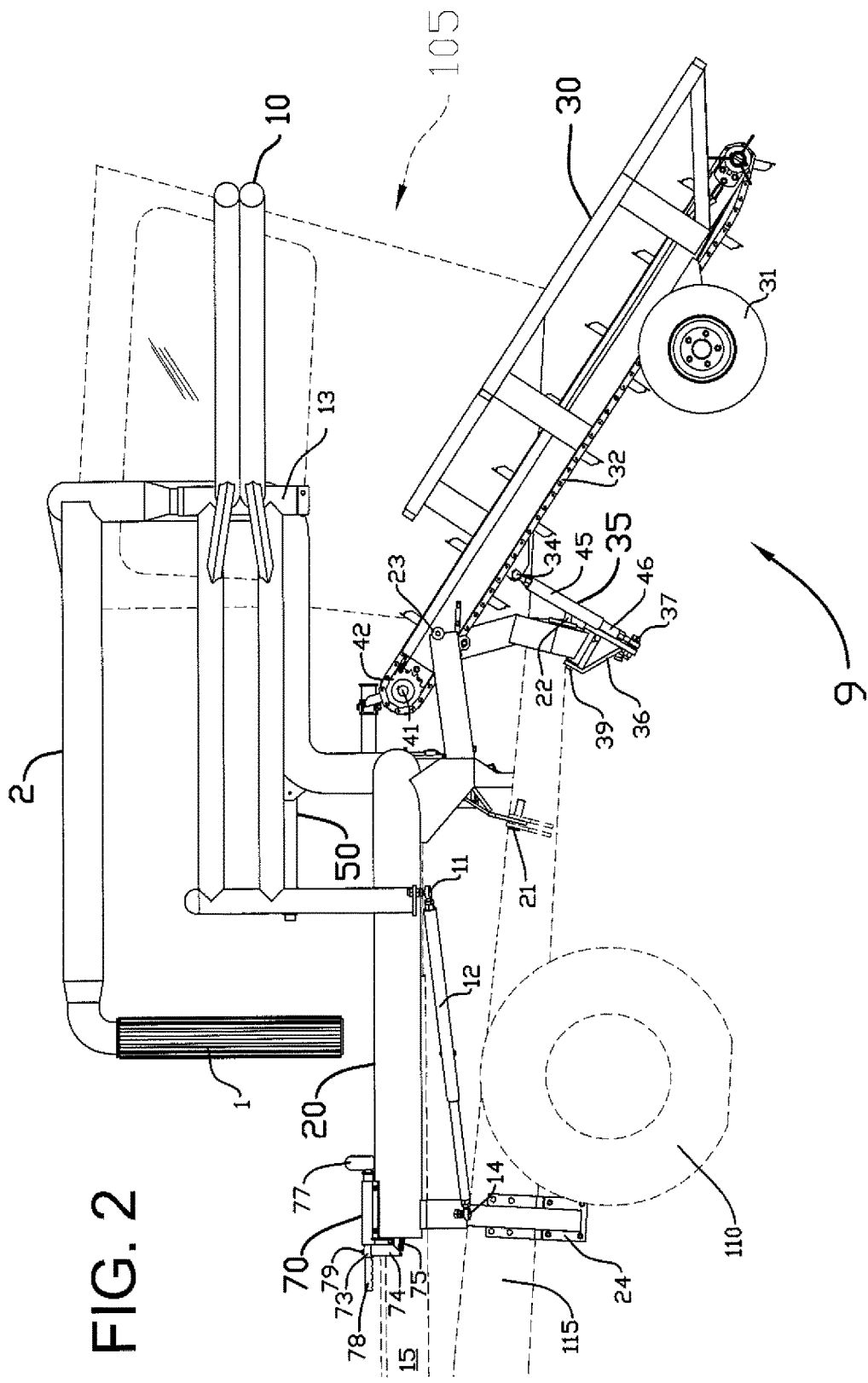
FIG. 2 is a side elevation view of the apparatus with the conveyor in the receiving position.

Referring to FIGS. 1 and 2, a bale loading apparatus 9 is shown for a transport vehicle 105. Apparatus 9 can be divided into six mechanical subcomponents, which are a frame 20, a conveyor 30, a carriage 2, a push arm 10, a bale limit sensing mechanism 50 and a bale trip sensing mechanism 70.

Frame 20 is mounted to a transport vehicle 105, at mounting points in, for example, four locations as described hereafter. The first location is to a mounting fixture 26 to the inside of the right front wheel 110 and underneath a receiving table 15. Mounting fixture 26 may be securely attached to a frame 115 of transport vehicle 105, for example using a plurality of bolts and nuts. Mounting fixture 26 is preferably configured with a mounting plate 25 attached to one end. Mounting plate 25 serves as a mounting surface for mounting plate 24 of frame 20. Mounting plates 24 and 25 are preferably joined with a plurality of nuts and bolts. The second and third mounting point locations are the existing small bale loader mounts on vehicles such as the New Holland™ stack wagon series, and are shown near pins 21 and 22. Other bale transport vehicles may not be equipped with the aforementioned mounts, thereby requiring an alternative connection to the frame 115 of transport vehicle 105 in one or more locations. The fourth location is to a mounting fixture 28 below and in front of receiving table 15 and on the left side of transport vehicle 105. Mounting fixture 28 is also preferably attached to frame 20 of the transport vehicle using a plurality of bolts and nuts, and the attaching member 27 of frame 20 is, for example, secured to mounting fixture 28 using one or more nut(s) and bolt(s) (also see FIG. 4). If a small bale loader is mounted on transport vehicle 105, typically it is dismounted before apparatus 9 is mounted.

Frame 20 comprises a plurality of members of various sizes and shapes. Frame 20 provides a rigid structure to which the components of apparatus 9 can be secured. Frame 20 in this embodiment provides a carriage pivot pin 4, which secures carriage 2 to frame 20, allowing pivotal movement of carriage 2 about an axis that is somewhat perpendicular to receiving table 15. The frame 20 also provides a secure mounting location for mounting pin 6 for a carriage drive actuator 3. Frame 20 also provides pivot bearings 23, which secure conveyor 30 to frame 20 and allow pivotal movement of the conveyor about a horizontal axis that is perpendicular to the normal direction of travel. Frame 20 also provides a rigid pivot bearing 39 for the conveyor lift drive link 36. Yet another function of frame 20 is to provide an anchor point for ball joint 14 of hook arm connecting link 12. Still another function of frame 20 is to provide a secure mounting location for bale trip sensor mechanism 70. Another function of frame 20 is to provide a pivotal mounting location for a bale limit sensor mechanism 50 about an axis that is generally perpendicular to receiving table 15.

Conveyor 30 is pivotally mounted to frame 20 at two locations 23. The front of conveyor 30 can be pivotally raised by an actuator 38. On vehicles such as the New Holland™ stack wagon series, actuator 38 is used to raise and lower the small bale attachment, and may also be used to raise and lower the conveyor 30. To raise conveyor 30, the operator may extend actuator 38 which is pinned to the conveyor lift drive link 36 by pin 33. Extension of actuator 38 causes conveyor lift drive link 36 to rotate about its pivot point 39 thereby elevating the lower ball joint 37 of conveyor lift link 35. Conveyor lift link 35 is mounted to conveyor 30 by its upper ball joint 34. Elevation of conveyor lift link 35 causes the conveyor 30 to rotate about pins 23 thereby raising the front of conveyor 30. Conveyor 30 may have wheels 31 attached to the front to allow the front of the conveyor 30 to follow uneven terrain while loading bales. Conveyor lift link 35 may be constructed of an outer tube 45 and a nesting tube 46 slidingly received within the outer tube, thereby allowing free extension and thereby allowing the front of conveyor 30 to easily elevate without the extension of actuator 38 if a sudden increase in terrain elevation is experienced.

Conveyor 30 comprises conveyor chains 32 to engage the bale and lift it from the ground onto frame 20 and receiving table 15. Each of conveyor chains 32 may be driven by a combination of sprockets 42, which are driven by a shaft 41, which is driven by a sprocket 40, which is driven by a chain 43, which is driven by a motor and sprocket 212 (see FIG. 9). Motor and sprocket 212 are mounted under shield 47 and are not shown in order to simplify the figures.

Figure 9:
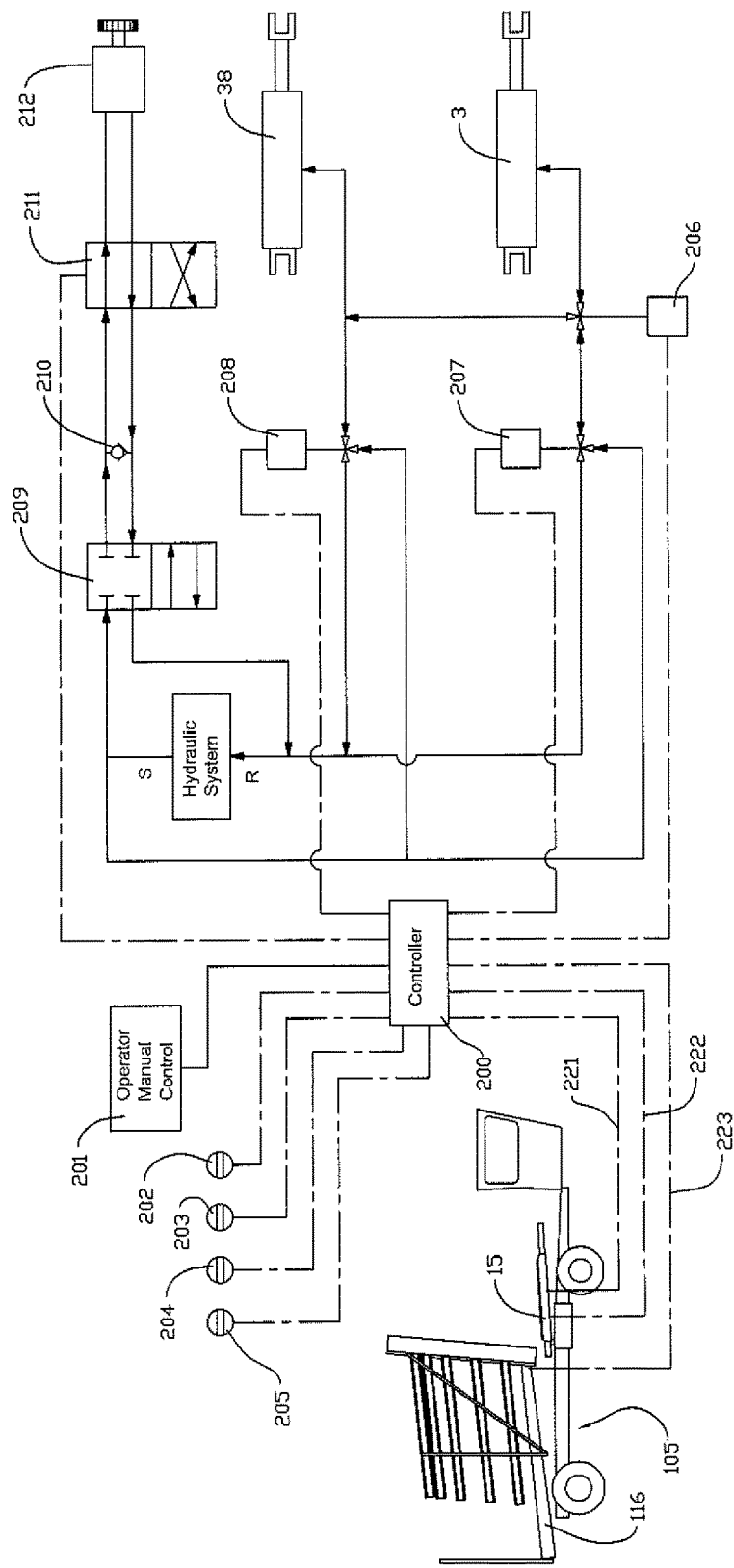
FIG. 9 is a simplified schematic of a control system for the big bale loading apparatus.

Referring to FIG. 9, conveyor drive motor 212 may be driven hydraulically by an operator control 209. On vehicles such as the New Holland™ stack wagon series, the hydraulic system used to drive the small bale loader motor may also be used to drive the conveyor drive motor of the apparatus. On vehicles that are not equipped with such a control it may be necessary to add a control 209 to the hydraulic system to allow the operator to operate the conveyor drive motor. Control 209 may be activated by manual linkage or by discrete electrical signal, or other means normally used in the art. Also provided in the system is check valve 210, which allows the free circulation of oil in the event that a bale is pushed up the conveyor at a speed that is greater than the normal operating speed of the conveyor. Further provided is a directional control valve 211 that allows the operator to reverse the direction of the conveyor through the operator manual control 201, or a separate switching device (not shown).

Referring back to FIGS. 1 and 2, carriage 2 is pivotally mounted to frame 20 by pin 4. Pin 4 allows carriage 2 to pivot about an axis that is generally perpendicular to the plane of receiving table 15. Carriage 2 is caused to rotate by the extension of carriage drive actuator 3, which may be pivotally fixed to carriage 2 by pin 5 on a first end and pivotally fixed to frame 20 by pin 6 on a second end. Carriage 2 may be used as a structure to contact the bale on either side, guiding it through the rotation and sliding motions to its forward placement on receiving table 15. Carriage roller 1 decreases the frictional drag between carriage 2 and the bale as the bale slides along this portion of carriage 2.

The push arm 10 is pivotally mounted to carriage 2 by bearing pipe 13. The aforementioned mounting allows push arm 10 to pivot about an axis that is generally perpendicular to the plane of receiving table 15. Push arm drive link 12 is attached to push arm 10 by ball joint 11. Push arm drive link 12 is also attached to frame 20 by ball joint 14. Rotation of carriage 2 decreases the distance between push arm pivot bearing pipe 13 and push arm drive link ball joint 14 thereby causing push arm 10 to rotate about bearing pipe 13. Push arm 10 may be used to engage the end of the bale and slide it within carriage 2 and across receiving table 15 as carriage 2 rotates.

Figure 3:
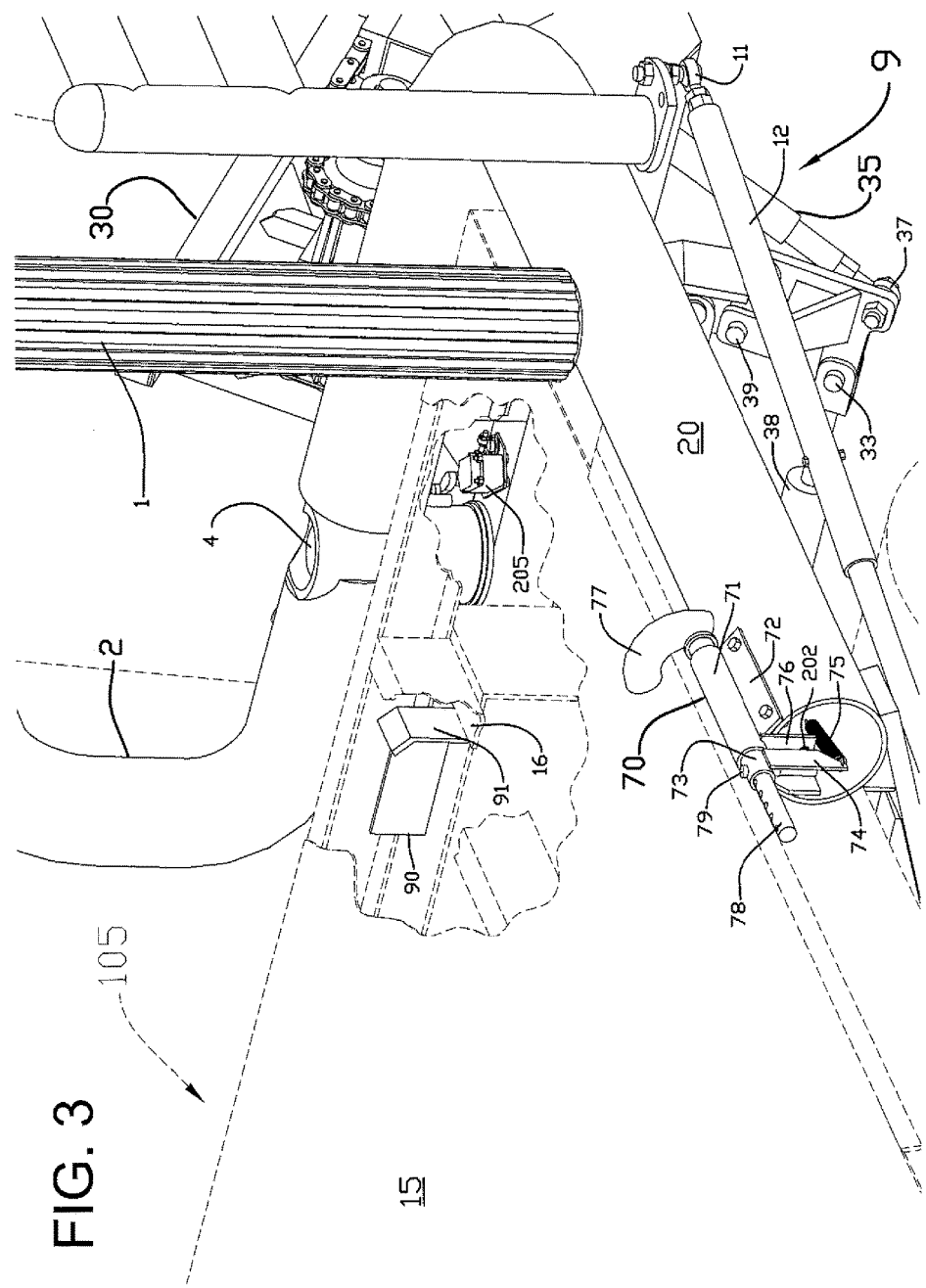
FIG. 3 is a perspective view of the right rear portion of the apparatus, in which a portion of the sheet metal and structure of the receiving table are removed to show several components of the apparatus.

Referring to FIG. 3, a stop 90 may be securely attached to vehicle 105 preferably using a plurality of nuts and bolts. The stop, in this embodiment, comprises a flat surface 91 that contacts a front support member 16 of receiving table 15 when significant lateral forces are applied to the front of receiving table 15 by apparatus 9, thus restricting lateral movement of the front of receiving table 15.

A bale trip sensing mechanism 70 may be added to apparatus 9 in order to aid in automating the movement of apparatus 9 by detecting the presence of a bale that has been deposited by conveyor 30 on receiving table 15. Bale trip sensing mechanism 70, in this embodiment, comprises outer tube 71 which is attached to mounting fixture 72 which is securely attached to frame 20 using a plurality of nuts and bolts, for example. Also attached to outer tube 71 is member 76, which may provide a mounting surface for bale trip sensor 202 and a mating surface for arm 74. Inner tube 73 is slidingly and rotatably received by outer tube 71 and is attached to arm 74. Arm 74 provides a mounting fixture for the rear end of spring 75 and may also be used to mount a sensing media for bale trip sensor 202 to detect. Spring 75 is preferably securely attached on its forward end to frame 20. Bumper 77 is securely attached to shaft 78, which is slidingly and rotatably received by inner tube 73. Shaft 78 may be attached to inner tube 73 by pin 79 among multiple holes in shaft 78. Through this configuration, a bale that is deposited by conveyor 30 on receiving table 15 may push rearward and/or downward on bumper 77 causing shaft 78 and thus inner tube 73 to be pushed rearward and/or rotated thereby causing spring 75 to be extended and also thereby removing the sensing media away from bale trip sensor 202. Removing the sensing media away from bale trip sensor 202 enables the sensor to send an initiation signal to a controller 200 (see FIG. 9) thereby allowing controller 200 to initiate a bale depositing cycle. Upon removing the bale from the proximity of bumper 77, spring 75 is allowed to retract and return the sensing media to bale trip sensor 202.

Figure 4:
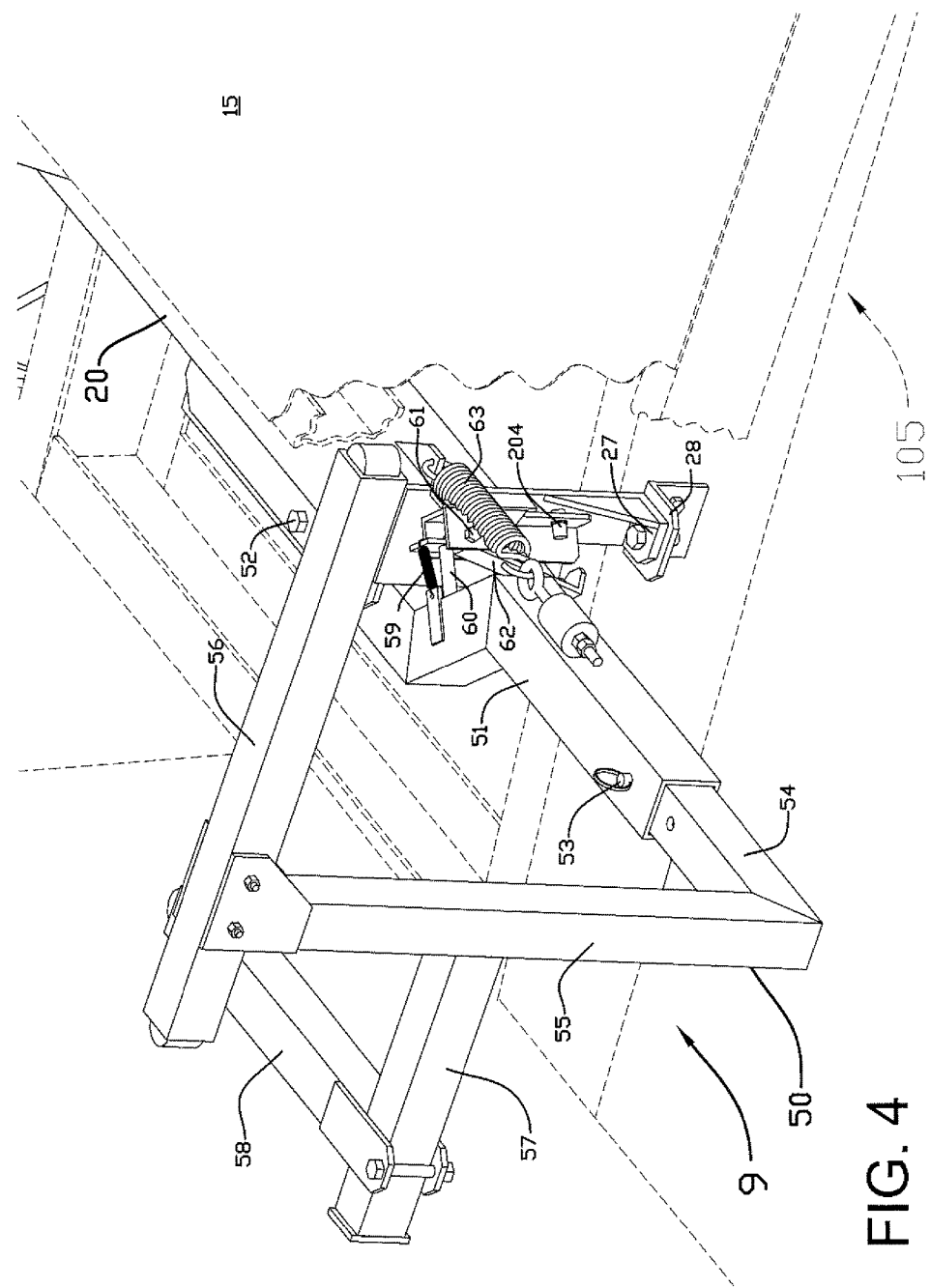
FIG. 4 is a perspective view of a left rear portion of the apparatus, in which a portion of the sheet metal and structure of the receiving table are removed to show components of the apparatus.

Referring to FIG. 4, bale limit sensing mechanism 50 may be added to apparatus 9 in order to aid in automating the movement of apparatus 9 by detecting the presence of a bale that has been deposited laterally on receiving table 15 by carriage 2 and push arm 10 (see FIGS. 1 and 2). Bale limit sensing mechanism 50, in this embodiment, comprises an outer tube 51 pivotally attached to frame 20 about an axis 52 that is generally perpendicular to the plane of receiving table 15. Inner tube 54 is slidingly received by outer tube 51 and may be attached to outer tube 51 by pin 53 among multiple holes in inner tube 54. Tower 55 is preferably securely attached to inner tube 54 preferably with its longitudinal axis generally vertical. Arm 56 is preferably securely attached to tower 55 preferably with its longitudinal axis in a generally horizontal position and generally parallel to the longitudinal axis of transport vehicle 105. Arm 57 is preferably securely attached to tower 55 preferably with its longitudinal axis in a generally horizontal position and generally parallel to the longitudinal axis of transport vehicle 105. Arm 58 is preferably adjustably mounted to arm 57 preferably with its longitudinal axis in a generally horizontal position and generally perpendicular to the longitudinal axis of transport vehicle 105. Spring 63 is preferably attached to outer tube 51 on its left end and to frame 20 on its right end. Sensor arm 62 is pivotally attached to frame 20 about an axis 61 that is generally horizontal and at an approximately 45 degree angle from the longitudinal axis of bale transport vehicle 105. Sensing media may be affixed to sensor arm 62 in order for bale limit sensor 204 to detect the proximity of sensor arm 62. Push rod 60 is preferably securely attached to outer tube 51 and configured to contact sensor arm 62 above its fulcrum 61. Spring 59 is attached on its forward end to outer tube 51 and on its rearward end to sensor arm 62 also above its fulcrum 61. Through this preferred configuration a bale that is deposited laterally on receiving table 15 by carriage 2 and push arm 10 (see FIGS. 1 and 2) pushes forward on arm 58, thereby pivoting outer tube 51 about its fulcrum 52 and thereby causing spring 63 to extend. Pivoting of outer tube 51 moves push rod 60 away from sensor arm 62, thereby allowing spring 59 to pull sensor arm 62 thus pivoting it about its fulcrum 61 and thereby allowing the bottom of the portion of sensor arm 62 to move towards bale limit sensor 204. Sensor 204 may detect the proximity of sensor arm 62 and send a signal to a controller 200 (see FIG. 9) that a bale has been deposited in a stacking position on the forward end of receiving table 15. Continuation of the stacking process removes the bale from the forward position of receiving table 15, thus allowing spring 63 to retract and thereby pivot outer tube 51 about its fulcrum 52, thus allowing push rod 60 to push sensor arm 62 and pivot it about its fulcrum 61, thereby moving the bottom of sensor arm 62 away from bale limit sensor 204.

Figure 5:
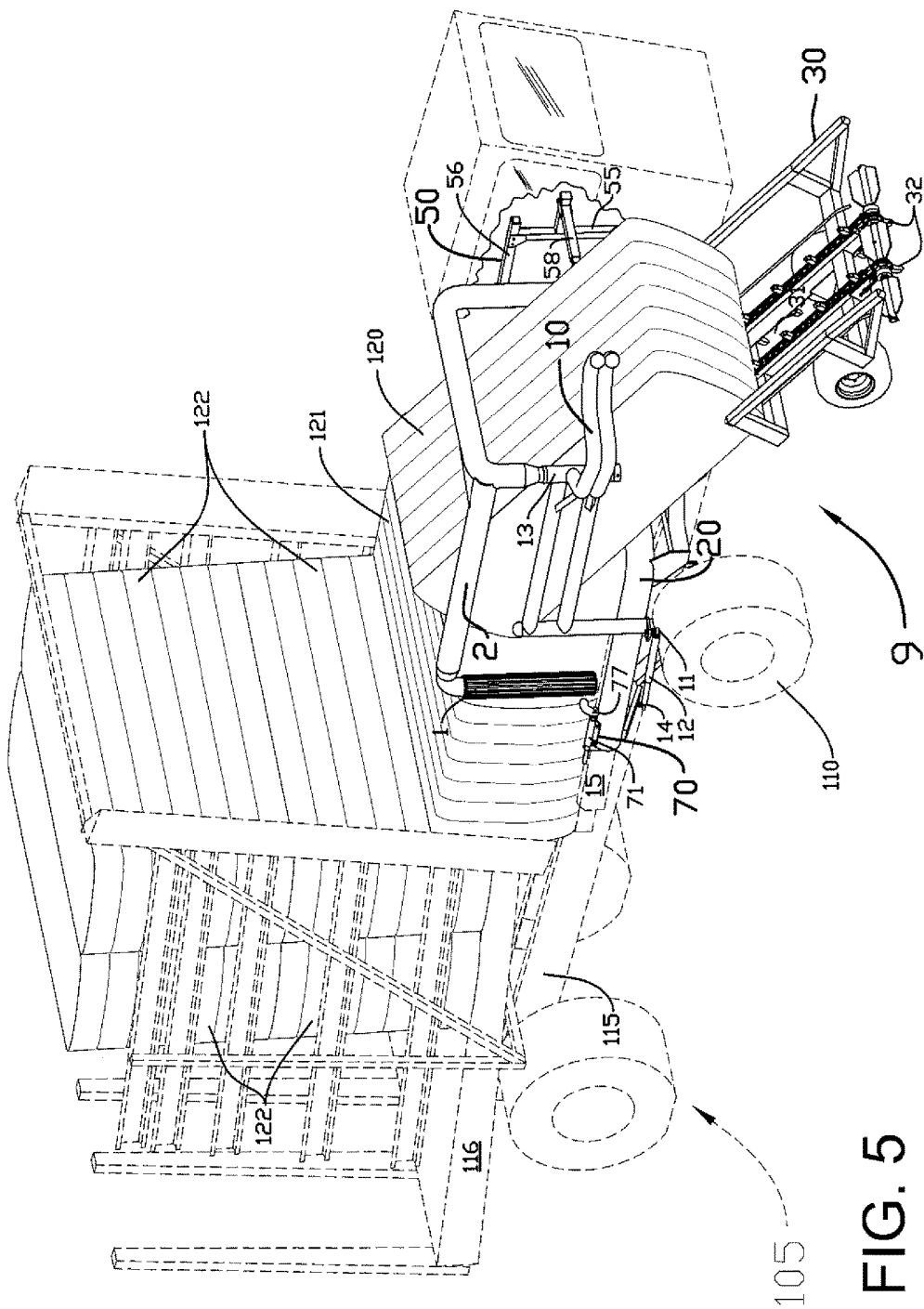
FIGS. 5, 6, 7 and 8 are perspective views of a right front portion of a transport vehicle equipped with the apparatus. These views show a plurality of big bales arranged on the transport vehicle which illustrate the various positions bales are moved to during the stacking operation. These views also illustrate operation of the apparatus to progressively move a big bale through a bale depositing cycle and into a stacking position on the receiving table of a transport vehicle.
Figure 6:
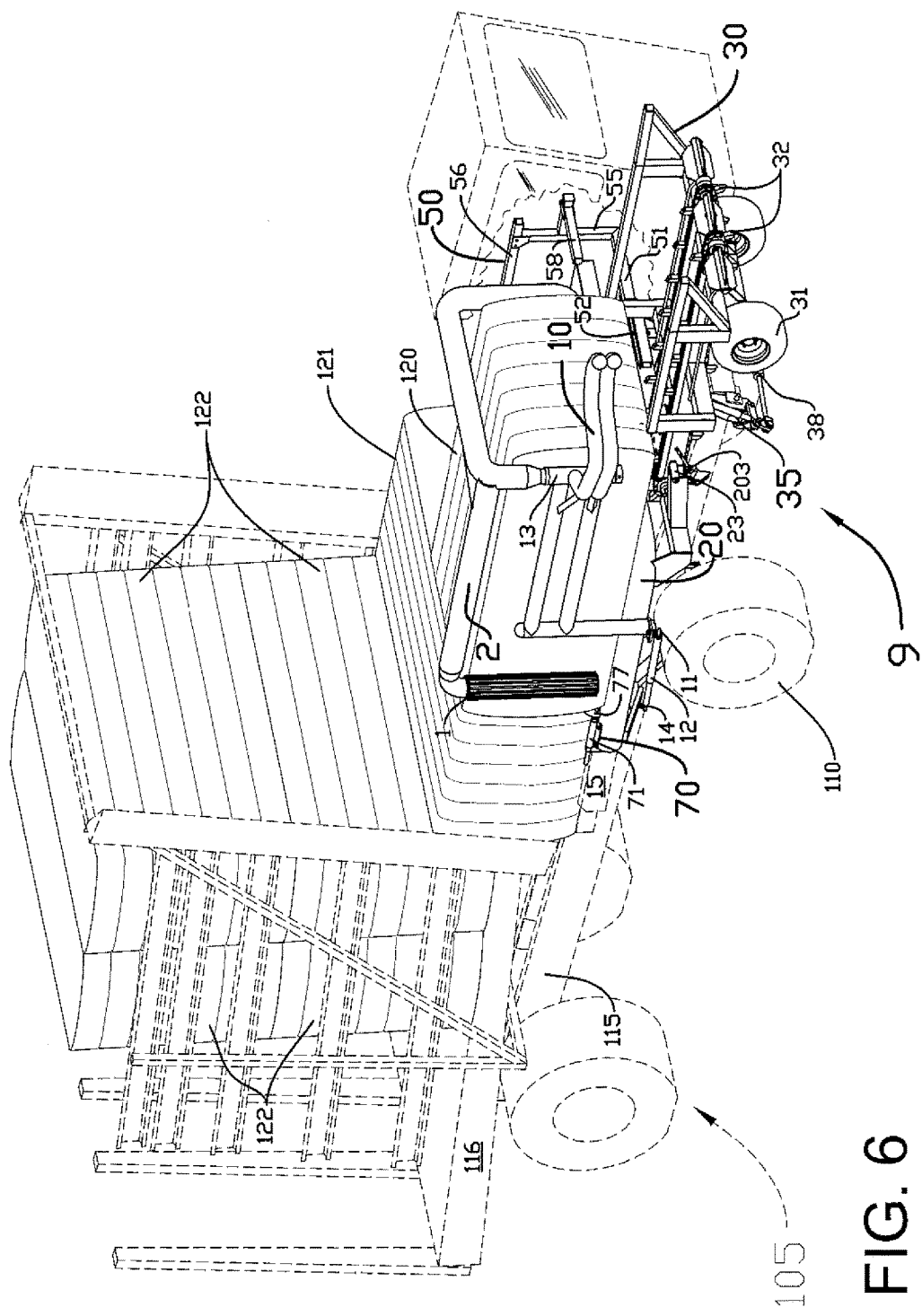
Figure 7:
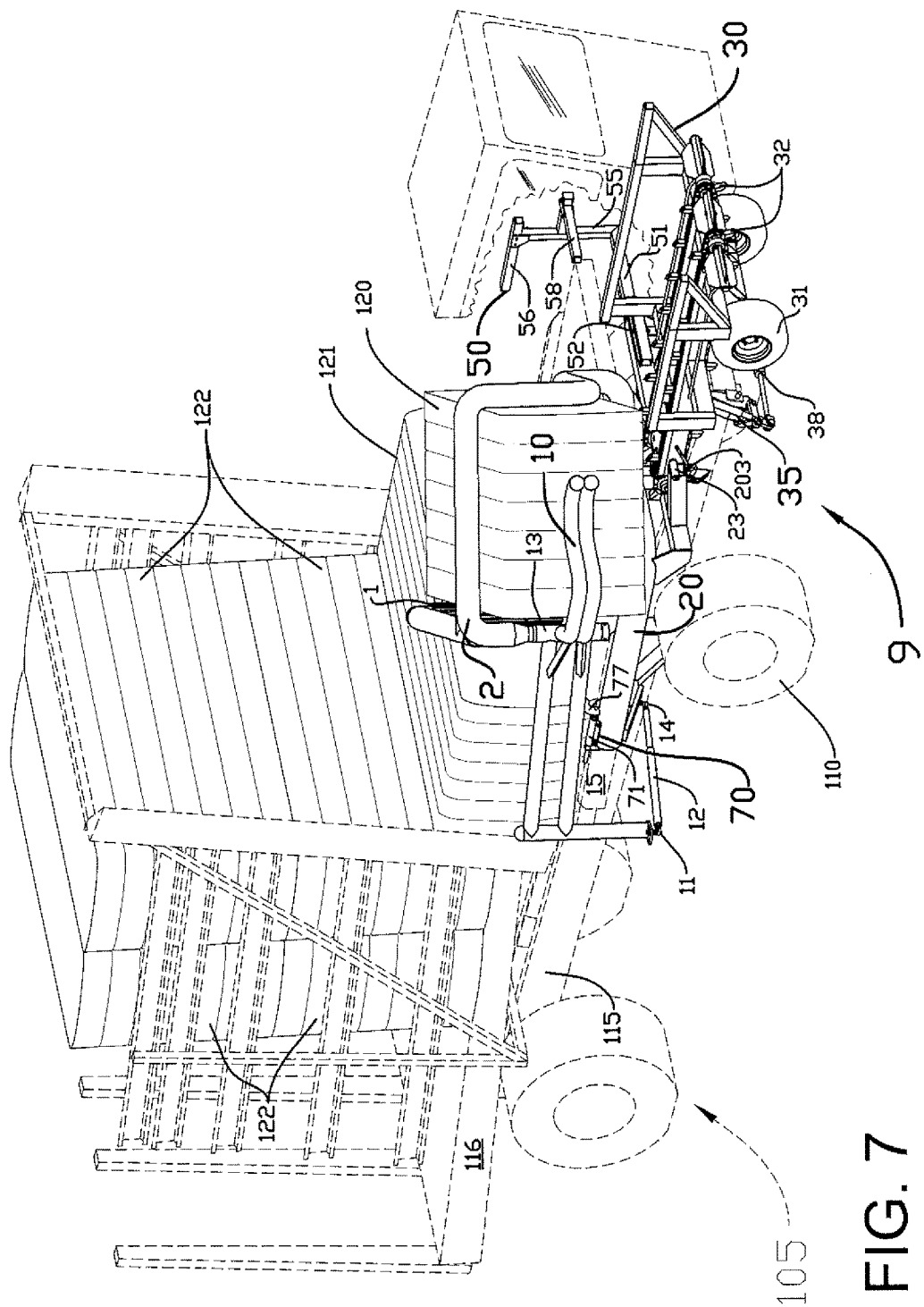
Figure 8:
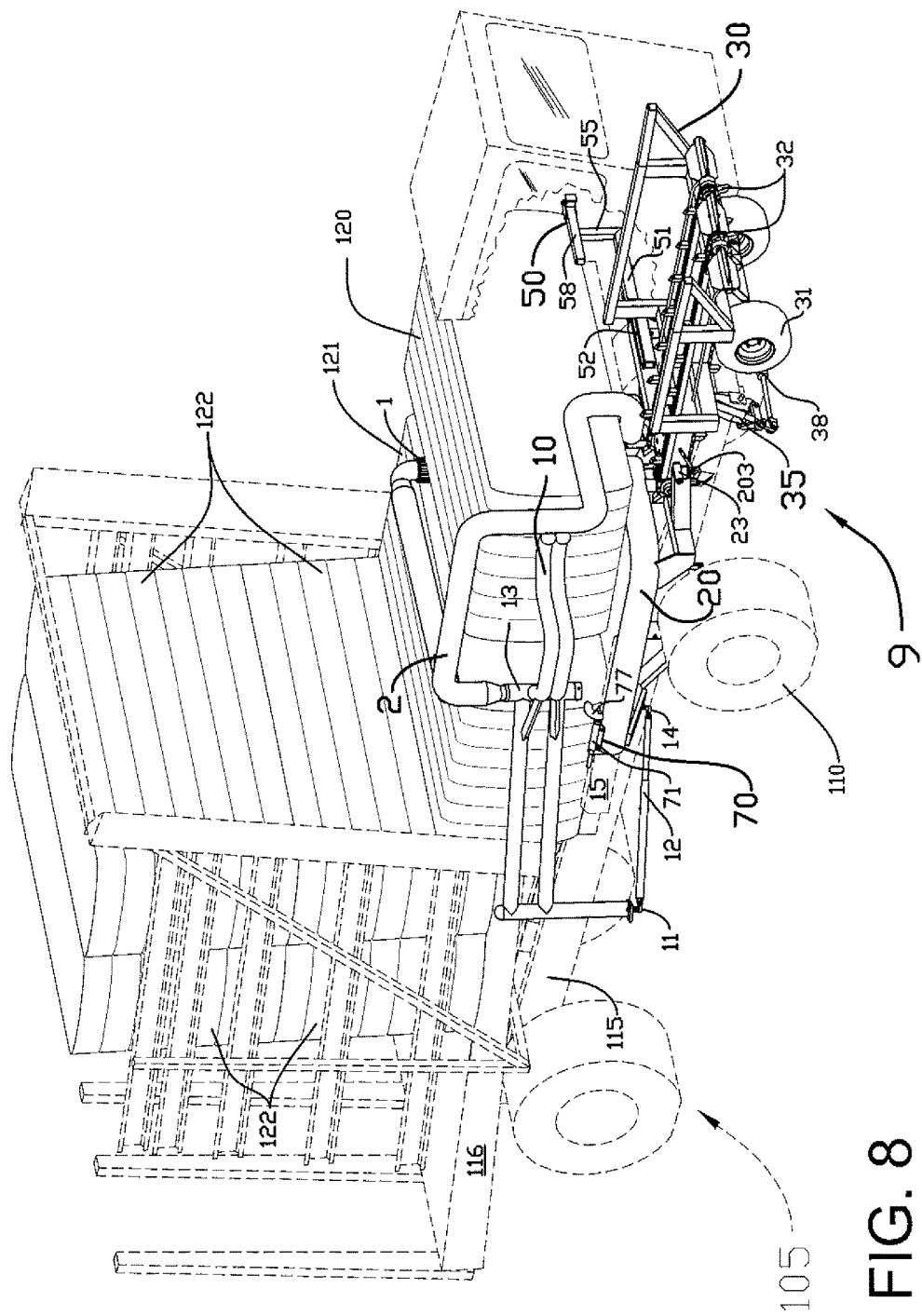

FIGS. 5, 6, 7 and 8 show the progressive movement of bale 120 as it travels through a bale depositing cycle and is thus placed into stacking position on the forward end of receiving table 15. Bale 121 has been placed into stacking position by apparatus 9 and has been moved to a rearward position on receiving table 15 by partially tilting receiving table 15 and thereby sliding bale 121 to its rearward position on receiving table 15. Bales 122 have also been stacked onto load table 116 by fully tilting receiving table 15. FIG. 5 is an illustration of bale 120 being elevated by conveyor 30. The center of gravity of bale 120 is forward of the pivot point of conveyor drive sprockets 42 (see FIGS. 1 and 2), and the bale is still fully engaged by conveyor 30. FIG. 6 is an illustration of bale 120 that has been elevated up conveyor 30 to a point where the center of gravity of bale 120 is rearward of the pivot point of conveyor drive sprockets 42, thus the bale has "tipped" onto frame 20 and receiving table 15. In an automated instance of apparatus 9, bale 120 has contacted bumper 77 of bale trip sensing mechanism 70, thereby causing a sensing media to be moved away from bale trip sensor 202 (see FIG. 3) and thus enabling bale trip sensor 202 to send an initiation signal to a controller 200 (see FIG. 9) thereby allowing controller 200 to initiate a bale depositing cycle. The front of conveyor 30 is raised, thus lowering the rear of conveyor 30 and thereby disengaging conveyor 30 from bale 120, In an automated instance of apparatus 9, controller ZOO, after receiving an initiation signal from bale trip sensor 202, may send an extend signal to conveyor lift actuator 38 until conveyor 30 has reached a raised position indicated by conveyor raise sensor 203. Bale 120 is now ready for rotation on receiving table 15, which is shown in FIGS. 7 and 8. Through the extension of carriage drive actuator 3, carriage 2 rotates bale 120 approximately 90 degrees and push arm 10 slides bale 120 within carriage 2 during rotation, Both carriage 2 and push arm 10 work together to place bale 120 in a stacking position on the forward end of receiving table 15 as shown in FIG. 8. In an automated instance of apparatus 9 and upon reaching a position indicated in FIG. 8, bale 120 pushes forward on arm 58 of bale limit sensing mechanism 50, thereby causing a sensing media to be moved toward bale limit sensor 204 (see FIG. 4) and thereby enabling sensor 204 to send a signal to controller 200 that bale 120 has been deposited in a stacking position on the forward end of receiving table 15. Upon the successful placement of bale 120 on the forward end of receiving table 15, actuator 3 may be retracted thereby returning carriage 2 to its initial, or "home", position. In an automated instance of apparatus 9, controller 200 may detect the home position of carriage 2 through a carriage home sensor 205 (see FIG. 3).

Again referring to FIG. 9, the process of loading bales onto a transport vehicle can be automated using a control system. The control system comprises a controller 200 which manages the bale depositing cycle and enables automated loading and stacking of bales. Controller 200 is programmed and configured to receive input signals, perform computational operations based on those input signals, and generate output signals for directing movement of the conveyor lift actuator 38, carriage drive actuator 3, and other actuators on bale transport vehicle 105. The controller may be a separate unit dedicated to managing operation of the accessory 9, or its function may be integrated into a controller tasked to manage the entire operation of bale transport vehicle 105. Controller 200 receives its first input signal from a bale trip sensor 202, which sends an initiation signal to controller 200 when the bale has reached a position similar to that shown in FIG. 6. Controller 200 may then send a signal to the conveyor lift valve 208, thereby extending the conveyor lift actuator 38 until the front of the conveyor 30 has been raised to a position indicated by sensor 203, which may send a signal to controller 200. Controller 200 may then send a signal to carriage control valve 207 to extend carriage drive actuator 3 until bale limit sensor 204 sends a signal to controller 200 that the bale has reached a stacking position on receiving table 15 similar to that shown in FIG. 8. Controller 200 may then send a signal to carriage control valve 207 to retract carriage drive actuator 3 until carriage home sensor 205 sends an input signal to controller 200 that the carriage 2 has reached its home position, which is the position desired for receiving bales.

Conveyor lift valve 208 and carriage control valve 207 are preferably derived from existing controls on transport vehicle 105, but may be added if necessary. On certain transport vehicles, it may be desirable to add conveyor lift diversion valve 206 which would direct oil to the conveyor lift actuator 38 instead of carriage drive actuator 3. In this instance controller 200 receives its first input signal from a bale trip sensor 202, which sends an initiation signal to controller 200 when the bale has reached a position similar to that shown in FIG. 6. Controller 200 may then send a signal to carriage control valve 207 and conveyor lift diversion valve 206 simultaneously, thereby directing the path oil to conveyor extend actuator 38 instead of carriage drive actuator 3 and thereby extending conveyor extend actuator 38. The extension of actuator 38 continues until conveyor 30 has been raised to a position indicated by sensor 203, which may send a signal to controller 200. Controller 200 may then send a signal to conveyor lift diversion valve 206 to restore the path of oil to carriage drive actuator 3 thereby ceasing oil flow to actuator 38 and thereby extending carriage drive actuator 3. Extension of carriage drive actuator 3 may continue until bale limit sensor 204 sends a signal to controller 200 that the bale has reached a stacking position on receiving table 15 similar to that shown in FIG. 8. Controller 200 may then send a signal to carriage control valve 207 to retract carriage drive actuator 3 until carriage home sensor 205 sends an input signal to controller 200 that the carriage 2 has reached its home position, which is the position desired for receiving bales.

Controller 200 may also include a counting function to monitor the number of bale depositing cycles completed. This counting function is needed to coordinate operation of the receiving table 15, which requires full or partial tilting movement with each bale placed transversely on the forward end of receiving table 15. The controller 200 may send an output signal 221 to actuators that tilt receiving table 15, thereby sliding the bale to the rear of receiving table 15, or loading bales onto the load table 116 of transport vehicle 105. The receiving table position is determined by well-known means, resulting in a receiving table position signal 222 which is provided to controller 200. Controller 200 coordinates the movement of receiving table 15.

Controller 200 may also use the previously described counting function to alert the operator when a full load has been reached. Full load capacity for the transport vehicle can be selected by operator input via operator manual control 201 or a built in function in controller 200. The load table down position is determined by well-known means and results in a load table down signal 223 which is also provided to controller 200. Controller 200 uses this signal to determine that a stack has been dumped from transport vehicle 105 and can then reset the counting function.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention. However, concepts as based upon the description may be employed in other embodiments without departing from the scope of the invention. Accordingly, the following claims are intended to protect the invention broadly as well as in the specific form shown.

What is claimed is:

1. A bale loading apparatus for loading bales onto a transport vehicle and integrated receiving table comprising:
   a. a frame configured to attach to a first end of the vehicle;
   b. a conveyor pivotally attached to the frame about an axis that is generally horizontal and perpendicular to the longitudinal axis of the vehicle, the conveyor including (i) a receiving end that, when in a lowered position at or near ground level, receives bales, and (ii) a discharge end;
   c. a conveyor lift mechanism configured to move the receiving end of the conveyor between the lowered position and a raised position, the raised position being at approximately a height of the discharge end of the conveyor;
   d. a carriage pivotally attached to the frame about an axis that is generally perpendicular to a receiving table and positioned on the frame, wherein as a bale is discharged from the discharge end of the conveyor, the bale is positioned within the carriage and on top of the receiving table, such that sides of the bale are engaged by the carriage;
   e. a carriage rotating actuator attached between the carriage and the frame configured to move the carriage between a bale receiving position and a bale depositing position;
   f. a push arm having a first end that engages an end of the bale and a second end, the push arm pivotally mounted to the carriage between the first and the second end, and with the first end toward the direction of travel, and the second end opposite the first; and
   g. a linkage attached between the second end of the push arm and the frame, the push arm configured to engage the end of the bale and push the bale toward a discharge area of the carriage as the carriage rotates.

2. The bale loading apparatus of claim 1 wherein the push arm and carriage are configured, through full extension of the carriage rotating actuator, to rotate and slide the bale from a deposited position by the conveyor, in which the longitudinal axis of the bale is substantially parallel to the longitudinal axis of the vehicle, to a position at the front of the receiving table, in which the longitudinal axis of the bale is substantially perpendicular to the longitudinal axis of the vehicle.

3. The bale loading apparatus of claim 2 wherein the push arm and the carriage are configured, through full retraction of the carriage rotating actuator and after depositing a bale, to return to a bale receiving position.

4. The bale loading apparatus of claim 3 further comprising a roller rotatably mounted to a substantially vertical member at a discharge end of the carriage.

5. The bale loading apparatus of claim 4 wherein the conveyor lift mechanism further comprises a rotating member rotatably attached to the frame, rotatably attached to a conveyor lift actuator, and rotatably attached to a first end of a conveyor lift link, wherein a second end of the conveyor lift link is rotatably attached to the conveyor, and wherein the conveyor lift link comprises an outer tube and a nesting tube slidingly received within the outer tube.

6. The bale loading apparatus of claim 5 wherein a stop is included on the bale transport vehicle and is configured to resist lateral movement of the front of the receiving table.

7. The bale loading apparatus of claim 6 further comprising a bale trip sensing mechanism configured to detect the presence of a bale deposited on the receiving table and within the carriage by the conveyor and to generate a bale trip signal.

8. The bale loading apparatus of claim 7 further comprising a bale limit sensing mechanism configured to detect the presence of a bale deposited to a position at the front of the receiving table at which the longitudinal axis of the bale is substantially perpendicular to the longitudinal axis of the vehicle and to generate a bale limit signal.

9. A method of converting a transport vehicle from a small bale stack wagon to a big bale stack wagon, comprising:
   a. unmounting a small bale loader;
   b. attaching a bale loading apparatus to the transport vehicle, the bale loading apparatus having a frame, a conveyor pivotally attached to the frame, a carriage pivotally attached to the frame, a carriage rotating actuator attached between the carriage and frame, a push arm pivotally attached to the carriage, a linkage attached between the push arm and the frame; and
   c. connecting a plurality of hydraulic lines to a drive motor of the conveyor and a plurality of hydraulic lines to the carriage rotating actuator, the hydraulic lines powered and controlled by a hydraulic system of the transport vehicle.

10. The method as described in 9 further comprising electrically connecting control sensors and/or electronic valves to the bale loading apparatus.

11. The method of claim 10 further comprising the step of connecting at least one hydraulic line to the conveyor lift actuator, the hydraulic line powered by a hydraulic system of the transport vehicle and controlled by a control system of the bale loading apparatus.

12. A method of loading a bale onto a transport vehicle, the method comprising:
   a. providing a frame configured to attach to a first end of the vehicle;
   b. providing a conveyor pivotally attached to the frame about an axis that is generally horizontal and perpendicular to the longitudinal axis of the vehicle, the conveyor including (i) a receiving end that, when in a lowered position at or near ground level, receives bales, and (ii) a discharge end;
   c. providing a conveyor lift mechanism configured to move the receiving end of the conveyor between the lowered position and a raised position, the raised position being at approximately a height of the discharge end of the conveyor;
   d. providing a carriage pivotally attached to the frame about an axis that is generally perpendicular to a receiving table and positioned on the frame, wherein as a bale is discharged from the discharge end of the conveyor, the bale is positioned within the carriage and on top of the receiving table, such that sides of the bale are engaged by the carriage;

e. providing a carriage pivotally attached to the frame about an axis that is generally perpendicular to a receiving table and positioned on the frame, wherein as a bale is discharged from the discharge end of the conveyor, the bale is positioned within the carriage and on top of the receiving table, such that sides of the bale are engaged by the carriage;

f. providing a push arm having a first end that engages an end of the bale and a second end, the push arm pivotally mounted to the carriage between the first and the second end, and with the first end toward the direction of travel, and the second end opposite the first;

g. providing a linkage attached between the second end of the push arm and the frame, the push arm configured to engage the end of the bale and push the bale toward a discharge area of the carriage as the carriage rotates;

h. receiving a bale in the receiving end of the conveyor when the receiving end of the conveyor is positioned near ground level;

i. operating the conveyor thereby raising the bale onto the receiving table;

j. extending said conveyor lift actuator thereby disengaging the conveyor from the bale;

k. extending the carriage rotating actuator thereby rotating the carriage and thereby rotating the push arm about the carriage, both the carriage and the push arm engaging and causing the bale to rotate and slide to its laterally deposited position on the receiving table; and l. retracting the carriage rotating actuator thereby rotating the carriage to the bale receiving position.

13. A control system that manages movement of a bale loading apparatus, the bale loading apparatus comprising (a) a frame configured to attach to a first end of the vehicle; (b) a conveyor pivotally attached to the frame about an axis that is generally horizontal and perpendicular to the longitudinal axis of the vehicle, the conveyor including (i) a receiving end that, when in a lowered position at or near ground level, receives bales, and (ii) a discharge end; (c) a conveyor lift mechanism configured to move the receiving end of the conveyor between the lowered position and a raised position, the raised position being at approximately a height of the discharge end of the conveyor; (d) a carriage pivotally attached to the frame about an axis that is generally perpendicular to a receiving table and positioned on the frame, wherein as a bale is discharged from the discharge end of the conveyor, the bale is positioned within the carriage and on top of the receiving table, such that sides of the bale are engaged by the carriage; (e) a carriage pivotally attached to the frame about an axis that is generally perpendicular to a receiving table and positioned on the frame, wherein as a bale is discharged from the discharge end of the conveyor, the bale is positioned within the carriage and on top of the receiving table, such that sides of the bale are engaged by the carriage; (f) a push arm having a first end that engages an end of the bale and a second end, the push arm pivotally mounted to the carriage between the first and the second end, and with the first end toward the direction of travel, and the second end opposite the first; and (g) a linkage attached between the second end of the push arm and the frame, the push arm configured to engage the end of the bale and push the bale toward a discharge area of the carriage as the carriage rotates, the control system comprising:

a. a bale trip sensor configured to detect the presence of the bale deposited by the conveyor on the receiving table and to send a bale trip signal, wherein the controller, upon receipt of the bale trip signal, initiates the bale depositing cycle;

b. a bale limit position sensor configured to detect the proximity of a bale laterally deposited by the carriage on the forward end of the receiving table with the longitudinal axis of the deposited bale being near perpendicular to the longitudinal axis of the vehicle, and to send a bale limit signal;

c. a carriage home position sensor configured to detect the bale receiving position of the carriage, and to send a carriage home position signal; and d. a controller programmed and configured to receive the bale trip signal and generate an actuator output signal that causes the extension of the carriage rotation actuator, thereby enabling the carriage to rotate towards a bale depositing position;

e. wherein the controller is further programmed and configured to receive the bale limit and carriage home position signals and generate an actuator output signal that causes the direction of movement of the carriage rotation actuator to be reversed when the bale limit signal is received, thereby enabling said carriage to be rotated towards a bale receiving position, whereby said carriage home position signal will be received by the controller and whereby the controller ceases said actuator output signal and causes movement of the carriage rotation actuator to stop.

14. The control system of claim 13, further comprising:

a. a conveyor raise sensor configured to detect the raised position of the conveyor, and to send a conveyor raised signal; and b. an electronic valve for changing the path of hydraulic oil from the carriage rotating actuator to the conveyor lift actuator;

c. wherein the controller is further programmed and configured to, upon receiving the bale trip signal and thereby initiating said bale depositing cycle, generate an output signal to activate the electronic valve, thereby directing oil to the conveyor lift actuator and causing the conveyor lift actuator to extend until a conveyor raised signal is received, whereby the controller ceases the output signal to the electronic valve, thereby restoring the normal path of oil to the carriage rotating actuator and enabling the bale depositing cycle to commence.

15. The control system of claim 13, further comprising:

a. a conveyor raise sensor configured to detect the raised position of said conveyor, and to send a conveyor raised signal;

b. wherein the controller is further programmed and configured to, upon receiving the bale trip signal and thereby initiating the bale depositing cycle, pause the bale depositing cycle and generate an output signal to extend the conveyor lift actuator and thereby pivot the conveyor towards a raised position until the conveyor raised signal is received, whereby the controller resumes the bale depositing cycle.

16. The control system of claim 13, further comprising a mechanical valve that changes the path of hydraulic oil from the carriage rotating actuator to the conveyor lift actuator, the mechanical valve giving priority to the conveyor lift actuator and thereby causing the conveyor lift actuator to fully extend before any extension of the carriage rotating actuator can take place.

17. A method of automatically controlling the operation of a bale loading apparatus for loading bales onto a transport vehicle, the method comprising the steps:
- a. providing a frame configured to attach to a first end of the vehicle;
- b. providing a conveyor pivotally attached to the frame about an axis that is generally horizontal and perpendicular to the longitudinal axis of the vehicle, the conveyor including (i) a receiving end that, when in a lowered position at or near ground level, receives bales, and (ii) a discharge end;
- c. providing a conveyor lift mechanism configured to move the receiving end of the conveyor between the lowered position and a raised position, the raised position being at approximately a height of the discharge end of the conveyor;
- d. providing a carriage pivotally attached to the frame about an axis that is generally perpendicular to a receiving table and positioned on the frame, wherein as a bale is discharged from the discharge end of the conveyor, the bale is positioned within the carriage and on top of the receiving table, such that sides of the bale are engaged by the carriage;
- e. providing a carriage pivotally attached to the frame about an axis that is generally perpendicular to a receiving table and positioned on the frame, wherein as a bale is discharged from the discharge end of the conveyor, the bale is positioned within the carriage and on top of the receiving table, such that sides of the bale are engaged by the carriage;
- f. providing a push arm having a first end that engages an end of the bale and a second end, the push arm pivotally mounted to the carriage between the first and the second end, and with the first end toward the direction of travel, and the second end opposite the first;
- g. providing a linkage attached between the second end of the push arm and the frame, the push arm configured to engage the end of the bale and push the bale toward a discharge area of the carriage as the carriage rotates;
- h. using a bale trip sensor configured to detect the proximity of a bale deposited from the conveyor onto the receiving table of the bale transport vehicle, to produce a bale trip signal;
- i. using a bale limit sensor configured to detect the proximity of a bale deposited by the carriage on the forward end of the receiving table with the longitudinal axis of the bale being near perpendicular to the longitudinal axis of the bale transport vehicle, to produce a bale limit signal;
- j. using a carriage home sensor configured to detect the bale receiving position of the carriage, to produce a carriage home signal;
- k. using a controller programmed and configured to receive the bale trip signal, bale limit signal, and the carriage home signal and to activate the carriage rotating actuator;
- l. propelling the bale transport vehicle to the first bale;
- m. positioning the conveyor to a lowered position with the receiving end near ground level and adjacent to the end of the first bale;
- n. operating the conveyor while propelling the bale transport vehicle;
- o. continuing to operate the conveyor until the bale is loaded on the receiving table and within the carriage, wherein the bale trip sensor is activated and sends an initiation signal to the controller, whereby the controller initiates a bale depositing cycle;
- p. generating by the controller an extend signal, the extend signal causing the carriage rotating actuator to rotate the carriage and bale to a bale depositing position;
- q. sensing by the bale limit sensor that the bale has reached the desired deposited position and sending a bale limit signal for receipt by the controller;
- r. generating by the controller a retract signal, the retract signal causing the carriage rotating actuator to rotate the carriage back to a bale receiving position;
- s. sensing by the carriage home sensor that the carriage has reached the bale receiving position, and sending a carriage home signal for receipt by the controller; and
- t. stopping by the controller any signal to the carriage rotating actuator thereby stopping rotation of the carriage at the home position and thereby ending the bale depositing cycle, whereupon the carriage is configured to accept the next bale.

18. The method as described in claim 17, further comprising the steps:
- a. using a receiving table on the bale transport vehicle with a raised and a lowered position, positioning the receiving table responsive to the receiving table actuator activated by the controller, the receiving table disposed on the bale transport vehicle such that the carriage, when not in the bale receiving position, prevents movement of the receiving table;
- b. programming and configuring the controller to monitor and direct movement of the receiving table;
- c. using a bale counting function in the controller to count the number of bale depositing cycles;
- d. inputting a maximum number of bales to be loaded on the bale transport vehicle into the controller using an operator input device; and
- e. alerting an operator that the maximum number of bales has been reached.

19. The method as described in claim 18, further comprising the steps:
- a. providing a manual control mode of operation in the controller selectable by an operator using an operator input device, wherein the operator can manage movement of the carriage and the receiving table using the operator input device;
- b. receiving a selection, from the operator, of the manual control mode of operation;
- c. receiving a direction, from the operator, of signals to cause a desired manual movement of the carriage rotation actuator and/or the receiving table;
- d. receiving a selection, from the operator, of the automatic control mode whereupon the controller resumes automatic control of the bale loading accessory and bale transport vehicle.

20. The method as described in claim 19, further comprising the steps:
- a. using a conveyor raise sensor configured to detect the raised position of the conveyor and produce a conveyor raised signal; and
- b. using an electronic valve that changes the path of hydraulic oil to be to the conveyor lift actuator instead of to the carriage rotating actuator;
- c. wherein the controller is further programmed and configured to, upon receiving the bale trip signal and thereby initiating the bale depositing cycle, generate an output signal to activate the electronic valve, thereby directing oil to the conveyor lift actuator and causing the conveyor lift actuator to extend until a conveyor raised signal is received, whereby the controller ceases the output signal to the electronic valve, thereby restoring the normal path of oil to the carriage rotating actuator and enabling the bale depositing cycle to commence.

21. The method as described in claim 19, further comprising the steps:
   a. using a conveyor raise sensor configured to detect the raised position of the conveyor and produce a conveyor raised signal;
   b. using a conveyor lift actuator activated by the controller;
   c. wherein the controller is further programmed and configured to, upon receiving the bale trip signal and thereby initiating the bale depositing cycle, pause the bale depositing cycle and generate an output signal to extend the conveyor lift actuator and thereby pivot the conveyor towards a raised position until the conveyor raised signal is received, whereby the controller resumes the bale depositing cycle.

* * * * *